(12) United States Patent
Schlemmer et al.

(10) Patent No.: US 7,976,764 B2
(45) Date of Patent: Jul. 12, 2011

(54) INVISIBLE LASER WEAKENING IN COMPOSITE MATERIAL

(75) Inventors: Christian Schlemmer, Landshut (DE); Hubert Pirkl, Tiefenbach (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 133 days.

(21) Appl. No.: 11/942,923

(22) Filed: Nov. 20, 2007

(65) Prior Publication Data
US 2008/0131643 A1 Jun. 5, 2008

(30) Foreign Application Priority Data
Nov. 20, 2006 (DE) .......................... 10 2006 054 592

(51) Int. Cl.
*B44C 1/22* (2006.01)
(52) U.S. Cl. .... 264/400; 264/482; 425/174; 219/121.71
(58) Field of Classification Search .................. 264/400, 264/482; 425/174; 219/121.71
See application file for complete search history.

(56) References Cited

U.S. PATENT DOCUMENTS

| | | | | |
|---|---|---|---|---|
| 3,604,890 A | * | 9/1971 | Mullaney et al. | 219/121.67 |
| 4,576,855 A | * | 3/1986 | Okina et al. | 428/215 |
| 4,686,128 A | * | 8/1987 | Gentilman | 428/44 |
| 5,609,284 A | * | 3/1997 | Kondratenko | 225/1 |
| 5,744,776 A | * | 4/1998 | Bauer | 219/121.7 |
| 6,113,131 A | * | 9/2000 | Uehara et al. | 280/728.3 |
| 7,121,578 B2 | | 10/2006 | Cowelchuk et al. | |
| 2003/0000927 A1 | * | 1/2003 | Kanaya et al. | 219/121.7 |
| 2005/0134023 A1 | * | 6/2005 | Cowelchuk et al. | 280/728.3 |
| 2005/0167956 A1 | | 8/2005 | Yasuda et al. | |
| 2005/0184488 A1 | * | 8/2005 | Yasuda et al. | 280/728.3 |

FOREIGN PATENT DOCUMENTS

| DE | 10 2004047634 A1 | 8/2005 |
|---|---|---|
| DE | 10 2005012720 A1 | 9/2006 |

* cited by examiner

*Primary Examiner* — Joseph S Del Sole
*Assistant Examiner* — Timothy Kennedy
(74) *Attorney, Agent, or Firm* — Wolf, Greenfield & Sacks, P.C.

(57) ABSTRACT

A method for the introduction of at least one locally limited weakening into a decorative composite, in particular for use in an automotive vehicle, by way of a plurality of laser beams, is disclosed. The decorative composite includes at least one decorative substrate, at least one decorative material and at least one upholstered layer arranged between the decorative substrate and the decorative material. The weakening is formed after the joining of the decorative composite as a sequence of first blind holes or perforations, which penetrate the decorative substrate completely, and unweakened webs between these blind holes or perforations. At least one second blind hole, which does not penetrate the decorative substrate, is introduced into at least one web. The first blind holes or perforations are formed in at least two operations, wherein in a first operation, a preliminary weakening which does not penetrate the decorative substrate completely is introduced into the decorative substrate and, in at least one further operation, at least one subsequent weakening of the decorative composition is introduced through the region of the preliminary weakening. Each subsequent weakening has a smaller cross-sectional area perpendicular to the depth of the decorative composite than the preliminary weakening. A trim element for an automotive vehicle, including a decorative composite produced according to the method is also disclosed.

19 Claims, 7 Drawing Sheets

INVISIBLE LASER WEAKENING IN COMPOSITE MATERIAL

CROSS REFERENCE TO RELATED APPLICATION

Foreign priority benefits are claimed under 35 U.S.C. §119 (a)-(d) of German Application No. DE 10 2006 054 592.3, filed Nov. 20, 2006, which is hereby incorporated by reference in its entirety.

BACKGROUND

1. Field

Aspects of the invention relate to a method of forming a weakening into a component, and in particular to a laser formed weakening in a trim piece for an automotive vehicle.

2. Discussion of Related Art

The introduction of weakenings or weakening lines in a decorative composite is widely used in particular in automotive vehicle construction. Weakenings or weakening lines of this kind form regions in the decorative composite at which the decorative composite tears, for example, upon airbag deployment or in the event of a crash. In this regard, parts of the decorative composite fold away or move toward each other in a defined manner.

Weakenings of this kind were typically formed either by seams having a defined tearing resistance or by means of mechanical tools, for example knives, milling tools, drills or the like. However, one drawback with such processes is the lack of precision for producing high-quality decorative components. In addition, such mechanical tools wear out and must be replaced to ensure a uniform cutting pattern.

Therefore, other approaches have also been disclosed for the introduction of weakenings. For example, laser beams have been employed to produce weakenings into decorative components. However the energy that is input into the decorative component by the laser beams needs to be removed from the weakened point without further damage to the decorative component or its appearance. The same applies to the waste gases formed during the combustion of materials as a result of the energy input from the laser.

In any case, a weakening in the decorative component should have a defined tearing resistance and preferably be invisible from the outside throughout the lifetime of the decorative component or at least not significantly change its appearance after production.

Methods for the introduction of a weakening in a decorative component employing a plurality of laser beams can be divided into two groups. In the first group, a composite layer structure of the decorative component is produced and then a predetermined breaking line is introduced into the component. In the second group, individual layers of the decorative composite are provided with weakenings and these pre-weakened layers are then joined together in a final step to form a weakened decorative composite.

One drawback of the second group is that multiple processing stages result in additional costs. In addition, unavoidable joining tolerances or the displacement of material during the joining and before the curing of adhesive and/or primer coats result in greater visibility of the weakened regions on the visible side of the component.

The drawback of the first group is that the high energy input required when weakening a multilayer decorative composite by employing lasers results in unavoidable material burnup at least in partial layers of the decorative composite. In particular, in the region of the upholstered layer, waste gases from laser-treated foamed materials with closed pores are only able to escape through the hole created by the laser itself. In the case of upholstered layers made of textile nonwovens or spacer fabrics, once again, both the volume expansion due to the generation of waste gases and uncontrolled material burnup in the regions adjacent to the weakening cause a bulging of the weakenings beyond the extent desired. For example, adjacent weakenings may combine in an undesirable manner at least in the upholstered layer and excessively weaken the decorative composite. Further, bulging of the weakening can occur in the upholstered layer, and possibly the layers surrounding the upholstered layer, so that the weakening becomes visible on the decorative side.

In the light of these problems, DE 102 27 118 A1 describes a method for introducing weakenings into a decorative composite comprising a carrier layer, a foam layer and a decorative layer in which a weakening is produced by a sequence of grouped blind holes of different lengths and breadths in the decorative composite. In this method, the decorative composite is weakened by the periodic arrangement of groups of blind holes of different depths and lengths. The first group of blind holes extend through virtually the entire decorative composite and are followed along the weakening by the second group of blind holes which extend only partially through the decorative composite. This second group of blind holes is then again followed by a group of blind holes of the first group.

However, this method does not solve the problem of the bulging of the blind holes in the region of the upholstered layer.

SUMMARY

According to one embodiment, a method for introducing at least one locally limited weakening into a decorative composite, using at least one laser beam, is disclosed. The decorative composite comprises at least one decorative substrate, at least one decorative material and at least upholstered layer arranged between the decorative substrate and the decorative material. The method includes, in a first step, forming the weakening after the joining of the decorative composite as a sequence of first blind holes that penetrate the decorative substrate completely leaving unweakened webs between the blind holes. The method also includes, in a second step, introducing at least one second blind hole that does not penetrate the decorative substrate into a least one web. Forming the first blind holes comprises forming the first blind holes in at least two operations. In a first operation, the method comprises introducing a preliminary weakening which does not completely penetrate the decorative substrate into the decorative substrate. In at least one further operation, the method comprises introducing at least one subsequent weakening of the decorative composite through the region of the preliminary weakening. Each subsequent weakening has a smaller cross-sectional area perpendicular to the depth of the decorative composite than the preliminary weakening.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which.

DETAILED DESCRIPTION

Figure 1:
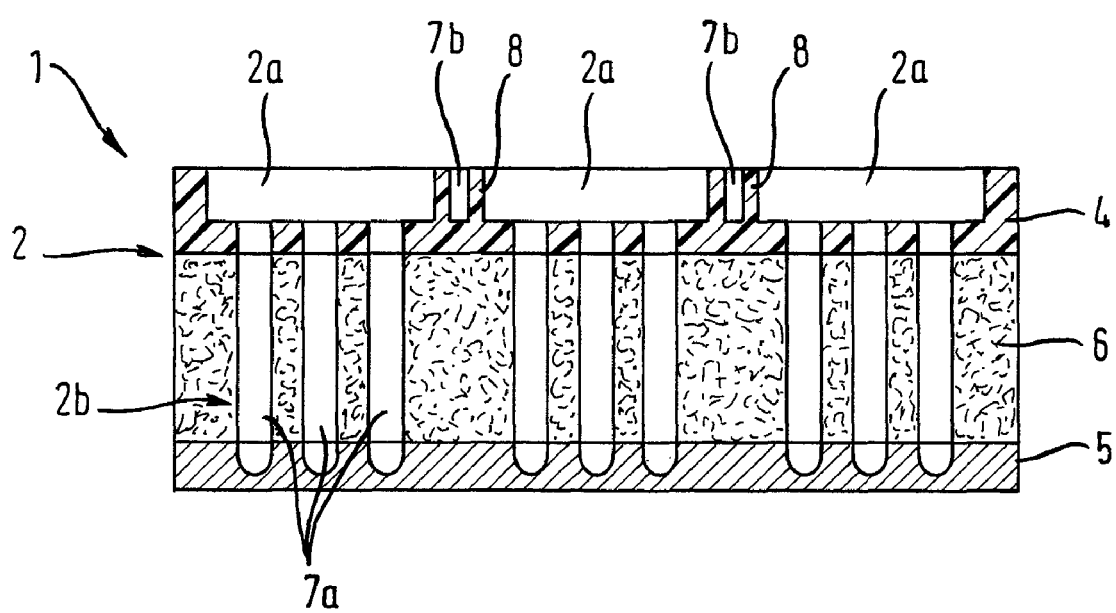
FIG. 1 is a first embodiment of a weakening introduced into a decorative component using a method according to one embodiment.

Aspects of the invention are directed to methods for the introduction of weakenings into a decorative component by employing one or more laser beams. As a result, there is no impairment to the appearance of the decorative component and that there is sufficiently low tear resistance along the weakenings.

According to an aspect of the invention, weakenings may be introduced into a decorative component with lasers whereby the component is exposed to laser energy adapted for each individual layer of the composite forming the component that is to be penetrated by the laser beam. This method enables the production of a locally weakened decorative composite in which the weakening can be introduced after joining the layers of the decorative composite in a gripping tool. Thus, it is not necessary to clamp individual layers of the composite independently of each other, form the weakening, and then join these individually weakened layers to each other. A decorative composite meeting the highest requirements regarding the precise adjustability of the tear resistance and with reference to its appearance can be formed.

In one embodiment, the weakening may be formed as a web of one or more blind holes, making it possible to enlarge the distance between the first blind holes or perforations or groups of first blind holes or perforations. The weakenings in the decorative composite are not noticeable or completely invisible on the side exposed to view.

The materials forming the decorative composite can be any suitable material including those typically used in decorative composites, such as those discussed above. Examples of suitable visible side materials are plastic decorative materials or decorative materials made of leather or a leather-like material. In one embodiment, sheets of plastic decorative materials made of PVC, PU, TPO or TPO foam can be used. Commonly used decorative substrate materials are ABS or ABS blends, PP GF or LFI substrates, which in one embodiment may be fiber-reinforced.

One or more layers comprising a foam material, a foam film (foam material with a continuous non-porous top layer), textile nonwovens or knitted fabrics, spacer fabrics, nonwovens or other suitable materials or combinations thereof may be arranged between the decorative substrate and decorative (i.e., exposed) layer.

It should be appreciated that the exposed layer (visible layer) is that portion or surface of the decorative component that faces the passenger compartment or otherwise visible to a vehicle occupant when the decorative component is installed and/or in use.

The layers forming the composite may be held together by any suitable arrangement. In one embodiment, an adhesive may be disposed between the individual layers of decorative substrate, decorative material and upholstered layer. A primer may also be provided. As a result, in one embodiment, a permanent, dimensionally stable decorative composite that is resistant to shear-forces can be obtained.

It should be appreciated that there is no limitations on the shape and extent of the weakenings introduced into the decorative composite by employing lasers. The same applies to the depth of the weakenings introduced by the lasers. In one embodiment, the laser weakenings terminate in a layer of the decorative composite and hence form blind holes.

The decorative composites are preferably used in automotive vehicles, for example in the region of the instrument panel, the center console or in door trims. However, the invention is not restricted to these installation locations, as other suitable locations may be employed.

In one embodiment, at least one locally limited weakening is introduced into the decorative component in at least two successive steps after joining individual layers forming a decorative composite. In this regard, in a first step, a sequence of blind holes and/or perforations, which penetrate the decorative substrate completely, is introduced into the decorative composite, wherein unweakened webs remain between these blind holes or perforations. In a subsequent process, at least one further blind hole is introduced into at least one web between the first blind holes or perforations. However, these blind holes to be introduced into the web do not penetrate the decorative substrate.

In one embodiment, the first blind holes or perforations introduced in the first step are formed in at least two operations. In a first operation, a preliminary weakening, which does not completely penetrate the decorative substrate, is introduced into the decorative substrate and, in at least one further operation, at least one subsequent weakening of the decorative composite is introduced through this preliminary weakening region. Each subsequent weakening has a smaller cross-sectional area perpendicular to the depth of the decorative composite than the preliminary weakening.

In this way, the first blind holes or perforations for weakening the decorative composite are introduced in such a way that, on the one hand, their cross-section can be limited to a minimum and, on the other hand, the energy required for the introduction of the respective first blind holes or perforations can be reduced to a minimum. In this regard, the laser penetrates only a very thin residual wall thickness of the decorative substrate for the introduction of these first blind holes or perforations.

In one embodiment, the decorative substrate is weakened in a first step in such a way that it only offers the desired maximum residual resistance to tearing along the weakening line. This introduction of weakenings into the decorative substrate does not change the appearance of the decorative composite on the side exposed to view, that is on the side of the decorative composite facing away from the decorative substrate. In addition, with the suitable introduction of a minimum number of first blind holes or perforations and/or a minimum necessary penetration depth of first blind holes in the decorative composite, there is no permanent detrimental influence on the appearance.

In addition, with a minimum energy input into the layers (such as an upholstered layer and/or the decoration layer), the waste gas formation (due to combustion, evaporation and burnup) within the layers is reduced to a minimum so that in one embodiment all the waste gases formed can be transported away through the blind hole or perforation hole.

The invention is not limited with regard to the number of weakenings or their shape. In one embodiment, however, the weakenings form an airbag break line in a decorative composite which is used in a trim element of an automotive vehicle. The at least one weakening can be formed as, for example, a long, linear weakening or a sequence of almost punctiform, short or long linear weakenings aligned with each other, or any combination thereof.

In one embodiment, every weakening comprises at least two subsequent weakenings arranged in a preliminary weakening. In one embodiment, the weakenings are substantially arranged equidistantly to each other. This produces a decorative composite comprising pairs or groups of blind holes or perforations whereby large regions of the decorative component between these pairs remain completely unweakened. In particular, in combination with the webs provided with at least one blind hole in the decorative substrate, this produces a sequence of paired or grouped blind holes or perforations in the entire decorative component with a web weakened by the additional blind hole over the length of the weakening. Thus, a wide variety of possible variations for weakening of the decorative component may be provided. Also, this provides the component designer the ability to design the component according to a desired tear resistance of the component.

In another embodiment, the cross-sectional geometries of the preliminary weakenings and subsequent weakenings within the decorative component (when viewed perpendicularly to the depth of the decorative component, hence perpendicularly to the plane clamped by the decorative component) differ. This substantially means the visible part of the rear of the decorative component when the weakened decorative component is viewed from above. In one embodiment, the preliminary weakening is substantially rectangular, wherein subsequent weakenings comprising substantially round cross-sectional geometries are arranged in each preliminary weakening. Accordingly, a row of round subsequent weakenings in a substantially slot-shaped preliminary weakening is provided.

In one embodiment, a method is provided in which no acute angles or sharp transitions are present within the upholstered layer and optionally the decorative material, which otherwise could result in undesirable and still visible cracks in the decorative composite when the decorative composite is exposed to shear forces. Without being limited, with the substantially rectangular or slotted shape of the preliminary weakening, straight acute angles or sharp transitions of this kind are deliberately introduced within the decorative substrate to influence crack initiation in the decorative substrate.

In the slotted embodiment, the geometry of the cross-sectional area of the preliminary weakening is not restricted with regard to its length or width, as the present invention is not limited in this regard. In one embodiment, a slot is introduced into the decorative substrate having a width of less than 1 mm. In one embodiment, the width is less than 0.6 mm. This weakening is less than the widths of prior art weakenings, resulting in an adequate weakening and simultaneously the lowest possible visibility of the weakening in a decorative composite.

As mentioned, in some embodiments, weakenings are introduced in the decorative composite using one or more laser beams when the energy input into each layer of the decorative composite is minimized. In one embodiment, the introduction of each preliminary weakening is performed with a greater laser power than the introduction of the respective subsequent weakenings into the decorative composite. In one embodiment, the laser power for the introduction of the preliminary weakening is between 150 and 250 watts. In one embodiment, the laser power is approximately 200 watts. The laser power for the introduction of the subsequent weakening, in one embodiment, is between 5 and 55 watts. In one embodiment, the laser power is between 10 and 30 watts.

In one embodiment, a "$CO_2$" laser with a maximum power of 250 watts is employed.

Processing times for the introduction of weakenings in the decorative composites are minimized as a result. This ensures that the introduction of the weakenings in the decorative composite is performed as gently as possible and simultaneously the formation of waste gases impairing the appearance of the decorative composite, burnup or the like is also minimized.

In another embodiment, the introduction of the subsequent weakening into the preliminary weakening introduced in a first step within the decorative composite is also performed in at least two successive operations. Thus, a second subsequent weakening in the decorative composite is introduced through a first subsequent weakening. The cross-sectional area of the second subsequent weakening perpendicular to the depth of the decorative composite, (i.e., perpendicular to the direction of incidence of the laser beam in the decorative composite) is smaller than the cross-sectional area of the first subsequent weakening through which the second subsequent weakening is introduced into the decorative composite.

According to one aspect, when the first subsequent weakening substantially extends through the entire upholstered layer and when the second subsequent weakening in turn forms a blind hole in at least parts of the decorative material, a weakening is created in which the laser power can be adapted for each individual layer of the decorative composite to be weakened. In each case, however, this introduces a weakening into the decorative composite which permits the lowest possible volume share of the decorative composite with a preferably constant tearing resistance. It should be appreciated, however, that the present invention is not limited in this respect, as the weakenings may be formed with a laser where the power is the same for each weakening.

In one embodiment, the first subsequent weakening and the second subsequent weakening are also arranged concentrically to each other, causing tear propagation along the desired tearing line. In one embodiment, the decorative substrate of the decorative composite comprises a substantially rigid material. In one embodiment, the substrate comprises fiber-reinforced plastic. In another embodiment, the substrate comprises leather. The decorative substrate performs a support function for the decorative composite in such a way that unwanted kinks in the decorative material may be avoided. If the decorative substrate also forms a structural element, for example generally in the region of the instrument panel of automotive vehicles, wherein the rigidity of the decorative substrate should prevent the denting or collapsing of parts of the instrument panel in the event of forces acting on the decorative composite, a decorative substrate with a greater rigidity than that of leather or composite materials may be desirable. However, the present invention is not limited in this respect, as any material having any rigidly may be employed.

The decorative material is also not restricted to specific individual materials, material combinations or thicknesses, as the present invention is not limited in this respect. In one embodiment, however, the decorative material comprises sheet goods with a plurality of layers, for example with a) a compact top layer b) a foamed intermediate layer and c) a tricot or piquet fabric. The person skilled in the art knows these kind of sheet goods as "thin sheet goods and "thick sheet goods", wherein usually the "thick sheet goods" design is achieved by applying "thin sheet goods" to one of the top layers of a spacer fabric.

In one embodiment, the decorative composite achieves a variable form, wherein, on the one hand, the appearance of the decorative material is maintained and, on the other, sufficient resistance to the action of impact forces or shear forces is obtained, even for partially weakened decorative material. In addition, the use of sheet goods of this kind as decorative material can also enhance the feel of the decorative composite. By utilizing the gas permeability of spacer fabrics within the sheet goods or an upholstered layer arranged therebelow, when temperature-controlled gases are passed through, it is possible both to reduce the heating-up of the decorative composite due to solar radiation and also to achieve an increase in the temperature for example of the interior of an automotive vehicle.

The methods described herein may be used with any kind of upholstered layer. However, in one embodiment, an upholstered layer comprising at least one spacer fabric and/or at least one textile nonwoven and/or at least one foam is employed. Suitable combinations of individual or more of these upholstery variants may also be employed. In one embodiment, an upholstered layer satisfying the desired feel requirements and depending upon the application, simultaneously satisfying sufficient strength and sufficient tearing resistance. These materials can be worked upon employing lasers for the introduction of weakenings.

In one embodiment, the temperature of the decorative composite can be increased or reduced relative to the ambient temperature before the introduction of the weakening to selectively change the material properties of at least individual layers to be weakened. The change in the temperature of the decorative composite, whether by heating or cooling, can be performed in any suitable way. As one example, the decorative composite may be heated by infrared lamps. In one embodiment, preliminary temperature control is at least assisted by cooling or heating in a device defining a receiving cavity.

In one embodiment, the decorative composite is cooled to a temperature in a range between approximately −40° C. and 0° C., and in one embodiment between approximately −40° C. and −30° C. Such a temperature range recognizes that decorative composites for use in automotive vehicles should have resistance to thermal cycling to temperatures as low as −40° C. For example, an airbag should reliably deploy in a temperature window of −40° C. to +85° C.

In addition, at the temperature range between −40° C. and 0° C. and particularly between −40° C. and −30° C., heat formed during the laser process can be dissipated more effectively than it can at room temperature. In addition, in the above temperature ranges, there is less material burnup and hence the weakening is less visible on a decorative side. Thus, at least one weakening is locally limited in the decorative composite with a simple and effective means and, on the other hand, the waste gases formed during the combustion, or evaporation waste gases and/or burnup are reduced to a minimum.

It should be appreciated that the present invention is not limited in this regard, as other suitable temperature ranges for forming the weakening may be employed.

In an alternative embodiment, the decorative composite is heated to a temperature in a range of between approximately +50° C. and +120° C., and in one embodiment between approximately +80° C. and +120° C. In this regard, materials used as decorative materials in automotive vehicles regularly have to withstand temperatures of up to +120° C. That is, in temperature cycle tests, automobile companies expect no visible damage to the decorative material in a temperature range between about +35° C. and +120° C.

In a range between approximately +50° C. and +120° C. and in particular between approximately +80° C. and +120° C., however, the component changes its material properties in such a way that it is sufficiently "soft" for the laser machining so that the weakening can be achieved with significantly less laser power and hence also reduced energy input. This will also result significantly reduced local material burnup in the direct vicinity of the weakened region, resulting in the weakening being much less visible on the decorative side.

Heating a decorative composite to significantly above room temperature renders the decorative composite uniformly "softened" by the temperature increase. Thus, the energy required for the introduction of the weakening or weakenings employing lasers can be significantly reduced. In the end, this results in greatly reduced burnup of the material surrounding the weakened regions.

Reducing the temperature of the decorative composite before forming the weakenings with the laser results in freezing of those regions of the decorative composite into which the laser energy is subsequently introduced. This results in a significantly higher energy input required to ignite the regions surrounding the weakenings. In addition, the reduced temperature at the surrounding areas result in the freezing of the weakened region and possibly of molten areas in the marginal regions of the weakenings.

It should be appreciated that forming the weakenings when the component is at a reduced temperature is not critical to the invention, as other suitable temperatures at which to form the weakenings may be employed.

In one embodiment, the dissipation of the waste gases is assisted by initiating a gas flow from outside at least through the weakened region and the surrounding regions. This can, for example, occur by creating a low pressure or excess pressure gas or air flow to one side of a gas-permeable layer, for example, in the decorative material or in the upholstered layer. If the decorative composite does not have any gas-permeable layers in one embodiment, suitable gas channels can be formed in the immediate vicinity of the actual weakenings can provide a gas flow restricted to the weakenings within the decorative composite. It should be appreciated that the number, penetration depth, arrangement and geometry of these gas channels are not limited, as any suitable gas channel may be formed. For example, those skilled in the art will recognize that a simple test may be employed to determine the number and/or arrangement of gas channels that is/are suitable.

In one embodiment, the gases conducted through the decorative composite or at least through the weakened regions are fire-retardant gases which at least suppress or completely prevent combustion within individual layers of the decorative composite. In one embodiment, this may be achieved by reducing the oxygen partial pressure in the relevant regions. In one embodiment, inert gases are conducted through the decorative composite, (i.e., gases which do not undergo any interaction such as combustion or flame propagation) with materials with which they come into contact. Examples of such gases are $CO_2$, nitrogen, helium, argon or the like and all mixtures thereof, as the present invention is not limited in this regard.

In one embodiment, the gases conducted through at least parts of the decorative composite are subjected to preliminary temperature control, whereby the gases can be heated or cooled.

Turning now to the figures, and in particular to FIG. 1, a cross-sectional view through a decorative composite 1 along a weakening 2 is shown. The weakening was introduced into the decorative composite 1 using a method according to one embodiment. In the embodiment depicted, the decorative composite 1 comprises a decorative substrate 4, a decorative material 5 and an upholstered layer 6 between the decorative substrate 4 and the decorative material 5. In one embodiment, the decorative substrate 4 comprises a fiber-reinforced polyurethane and is substantially rigid and dimensionally stable. The decorative material 5 in one embodiment is a single-layer leather. Arranged between the polyurethane substrate 4 and the decorative leather 5 is a layer of a spacer fabric 6. The spacer fabric comprises two cover layers (not shown) at the interfaces of the spacer fabric 6. Both the decorative substrate 4 and the decorative material 5 and a layer comprising spacer threads are arranged substantially in parallel to each other and perpendicular to the cover layers (not shown).

In one embodiment, in a first step, a row of preliminary weakenings 2a is introduced into the decorative substrate 4 in the form of slot-shaped blind holes. In the embodiment depicted, the length of these preliminary weakening is approximately 4 mm and the width (as measured into the plane of the drawing sheet) is less than 0.6 mm. Between the preliminary weakenings 2a, there remain webs 8, which in one embodiment are all provided with blind holes 7b in order to weaken the decorative substrate 4 still further between the individual preliminary weakenings 2a. In one embodiment, in a further step, a row of blind holes 7a is introduced through the preliminary weakenings 2a as a subsequent weakening 2b in the decorative composite 1. In this embodiment, three blind holes 7a spaced equidistantly from each other are each arranged in a preliminary weakening 2a. These blind holes 7a have a substantially round cross section and extend through the residual wall thickness of the decorative substrate 4 and the upholstered layer 6 and terminate in the decorative material 5. As mentioned above, these weakenings can be formed by a laser.

Figure 2:
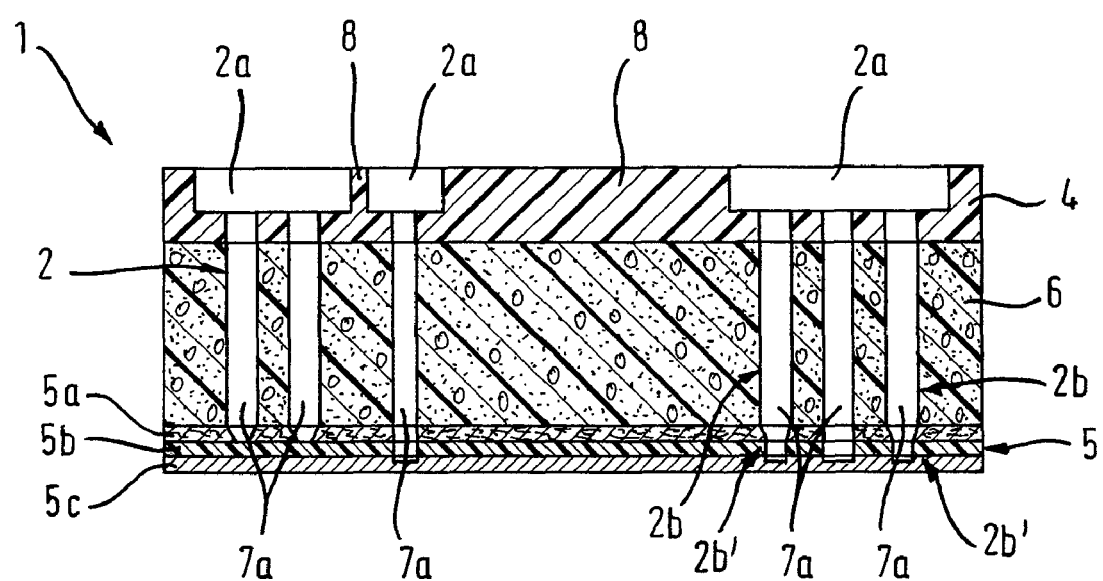
FIG. 2 is a second embodiment of a decorative component weakened using a method according to one embodiment.

FIG. 2 is a schematic cross-sectional view of a second embodiment of a decorative composite 1 into which a row of different weakenings 2 have been introduced. In this embodiment, the decorative composite 1 again comprises a decorative substrate of fiber-reinforced polyurethane on which is arranged a foam 6 with substantially closed pores. On the side exposed to view (i.e., at the bottom of the figure), the decorative composite 1 finishes with a three-layer decorative material 5, which comprises a tricot material 5a, (that is, a textile material with a fine rib structure), a polyurethane intermediate layer 5b and a polyurethane compact layer 5c. Similarly to the embodiment in FIG. 1, once again, a row of preliminary weakenings 2a of a different length and width, but each with a rectangular cross section have been introduced into the decorative substrate 4. Between the preliminary weakenings 2a, there remain webs 8 of different widths. In this embodiment, no blind holes have been introduced, however, the present invention is not limited in this respect, as additional web weakenings may be included.

Proceeding from left to right in FIG. 2, into the preliminary weakening 2a, two blind holes 7a of the same length and with the same cross section are introduced. Each extend through the foam layer 6 and through the entire tricot material 5a. Viewed from left to right, in the adjacent preliminary weakening 2a, only one blind hole 7a is introduced into the decorative composite 1. In this embodiment, as can be seen, this blind hole 7a has a smaller cross section than the other blind holes 7a and extends through both the tricot 5a and the polyurethane intermediate layer 5b and partially into the polyurethane compact layer 5c.

As shown at the far right of FIG. 2, in one embodiment, three blind holes 7a are arranged with equidistant spacing to each other within the preliminary weakening 2a. The two outer flanking blind holes 7a are introduced into the decorative composite 1 in two operations. In a first operation, a laser is used to form a blind hole 7a which comprises a first subsequent weakening 2b and a second subsequent weakening 2b' arranged concentrically to the first subsequent weakening 2b. Similar to the embodiment on the far left, the first subsequent weakening 2b with a first, round cross-sectional region extends through the residual wall thickness of the decorative substrate 4 and the foam layer 6 and the tricot material 5a of the decorative material 5. In a further operation, after the introduction of this first subsequent weakening 2b, a second subsequent weakening 2b' is introduced extending substantially through the polyurethane intermediate layer 5b and into the polyurethane compact layers 5c. As shown, the middle weakening 7a does not include the weakening 2b'. Although the weakenings shown on the right side of FIG. 2 that differ from those shown on the left are shown in a single decorative composite, the style of weakenings may be formed in separate decorative composites.

Figure 3:
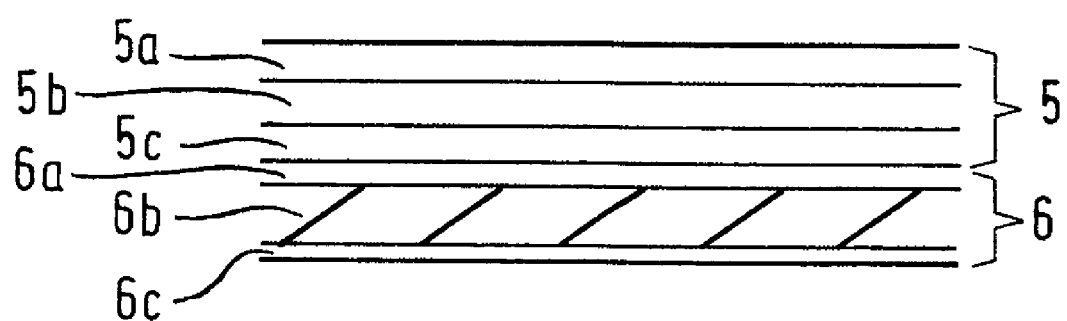
FIG. 3 is a first embodiment of sheet goods suitable for use in the decorative component.

FIG. 3 shows a first variant of a structural assembly of polyurethane sheet goods, which for the purpose of producing a decorative composite (not shown in full here) are already laminated to a spacer fabric 6. The "thick sheet goods" therefore comprise both the decorative material 5 as "thin sheet goods" and a spacer fabric 6 as at least part of the upholstery layer. In this embodiment, when viewed from top to bottom, the "thin sheet goods" comprise a compact top layer 5a, a foamed intermediate layer 5b and a layer made of tricot or piquet material 5c. Arranged below these "thin sheet goods" comprising layers 5a to 5c, there is a layer of a spacer fabric 6 comprising an upper top layer 6a, a lower top layer 6c and a layer arranged therebetween with spacer threads 6b. However, in this regard, the cross-hatched region in the figure does not show the direction of the spacer threads 6b in the non-stressed state of the spacer fabric 6. The structural assembly depicted here is produced by joining decorative material 5 in advance and then laminated onto the spacer fabric 6 in a bonding process.

Figure 4:
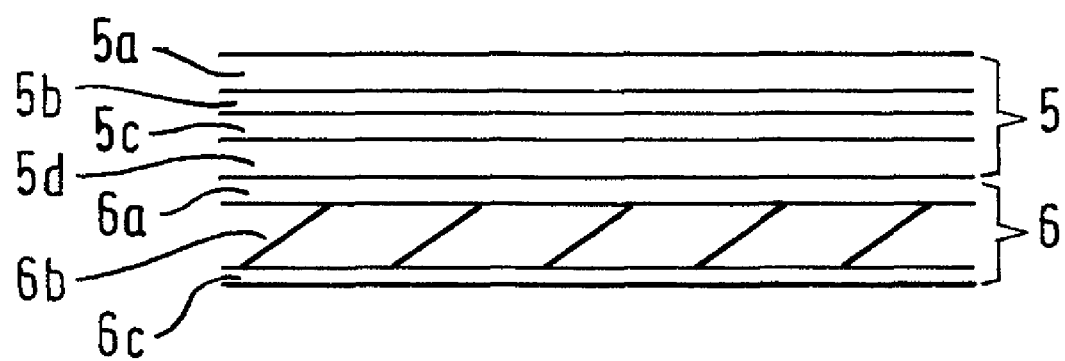
FIG. 4 is a second embodiment of sheet goods suitable for use in the decorative component.

FIG. 4 shows a second variant of a possible structural assembly of polyurethane "thick sheet goods" which, similar to the embodiment in FIG. 3, comprise a decorative material 5 as "thin sheet goods" and a spacer fabric 6 arranged therebelow. Therefore, similar to the embodiment in FIG. 3, the composite of the "thin sheet goods" 5 and the spacer fabric 6 forms the "thick sheet goods" as part of a decorative composite (not shown in full). In the embodiment depicted, the decorative material 5 comprises a compact top layer 5a, a foamed intermediate layer 5b, a layer of tricot or piquet material 5c and a nonwoven layer 5d. Similar to the embodiment in FIG. 3, below this decorative material composite layer 5 described as "thin sheet goods" there is arranged a spacer fabric 6 comprising two top layers 6a, 6c and an intermediate layer of spacer threads 6b. Here, once again the structural assembly shown is produced by joining the decorative material 5 in advance of lamination onto the existing spacer fabric 6 using a suitable bonding method.

Figure 5:
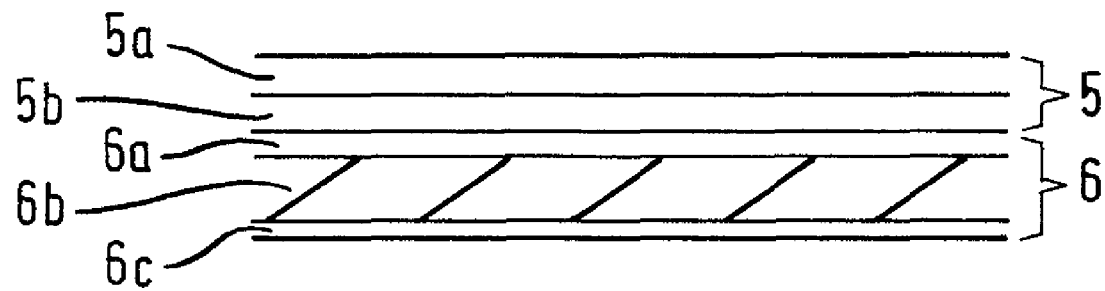
FIG. 5 is a third embodiment of sheet goods suitable for use in the decorative component.

FIG. 5 shows a third variant of so-called "thick sheet goods" as part of a decorative composite (not shown in full), wherein, in this regard, the decorative material 5 comprises two layers, namely a compact top layer 5a and a foamed intermediate layer 5b. Once again, arranged below this two-layer assembly for the decorative material 5 there is a spacer fabric 6 comprising two top layers 6a, 6c and an intermediate layer of spacer threads 6b. The depicted structural assembly of decorative material 5 and spacer fabric 6 is produced by applying the respective layers 5a, 5b of the decorative material 5 one after the other onto the spacer fabric 6 in a spread-coating process.

Figure 6:
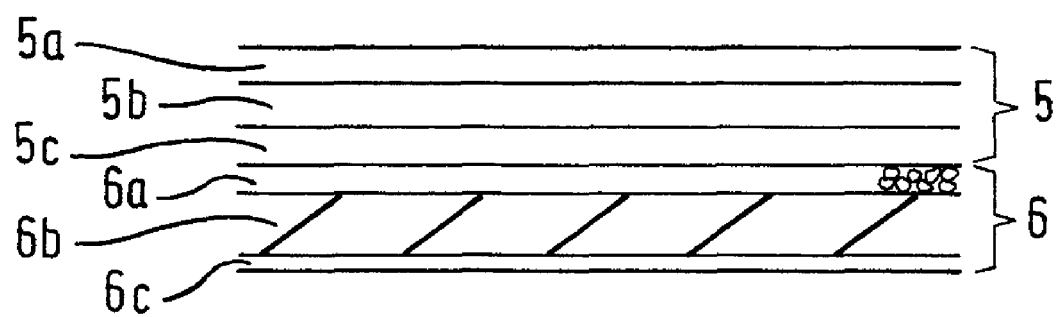
FIG. 6 is a fourth embodiment of sheet goods suitable for use in the decorative component.

FIG. 6 shows a fourth variant of "thick sheet goods", comprising a three-layer decorative material 5 and a three-layer upholstered layer 6. Similar to the embodiments in FIGS. 3 and 4, the decorative material layer 5 known as "thin sheet goods" comprises a compact top layer 5a, a foamed intermediate layer 5b and beneath this a layer of tricot or piquet material 5c. Unlike the variants shown in FIGS. 3 to 5, the upholstered layer 6 comprises a modified spacer fabric 6. The modified spacer fabric 6 includes an upper top layer 6a implemented as a soft-touch top layer. On the other hand, the design and thickness of the lower top layer 6c and the layer of spacer threads 6b are identical to the variants in FIGS. 3 to 5.

Figure 7:
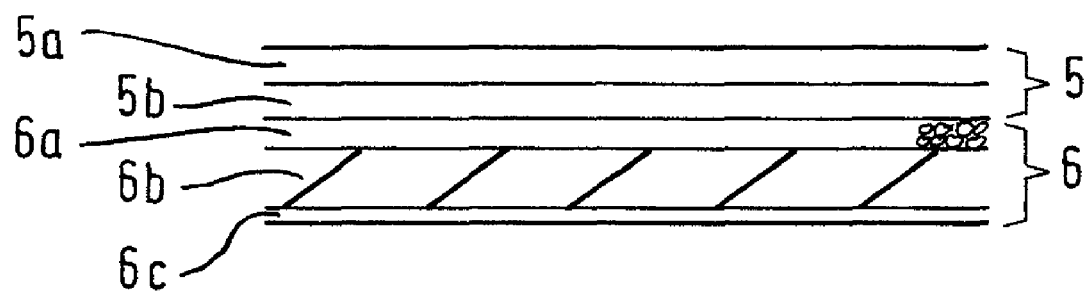
FIG. 7 is a fifth embodiment of sheet goods suitable for use in the decorative component.

FIG. 7 shows a fifth variant of a structural assembly of polyurethane "thick sheet goods" in which a compact top layer 5a together with a foamed intermediate layer 5b forms the decorative material 5. Similar to the variant shown in FIG. 6, the spacer fabric 6 is also modified in that the upper top layer 6a has a soft-touch design. The layer of spacer threads 6b and the lower top layer 6c are identical to the embodiments in FIGS. 3 to 6. The "thick sheet goods" are produced by forming the material composite of the decorative material 5 by joining the layers 5a to 5c in a first step and then laminating this decorative material 5 onto the spacer fabric 6 in a bonding process.

Having thus described several aspects of at least one embodiment of this invention, it is to be appreciated various alterations, modifications, and improvements will readily occur to those skilled in the art. Such alterations, modification, and improvements are intended to be part of this disclosure, and are intended to be within the spirit and scope of the invention. Accordingly, the description and drawings herein are by way of example only.

What is claimed is:

1. A method for introducing at least one locally limited weakening into a decorative composite, using at least one laser beam, wherein the decorative composite comprises at least one decorative substrate, at least one decorative material and at least one upholstered layer arranged between the decorative substrate and the decorative material, the method comprising:
    in a first step, forming the weakening after the joining of the decorative composite as a sequence of first blind holes that penetrate the decorative substrate completely leaving unweakened webs between the blind holes; and
    in a second step, introducing at least one second blind hole that does not penetrate the decorative substrate into at least one web, and
    wherein forming the first blind holes comprises forming the first blind holes in at least two operations, wherein, in a first operation, the method comprises introducing a plurality of spaced apart preliminary weakenings which do not completely penetrate the decorative substrate into the decorative substrate and, in at least one further operation after the first operation of introducing the plurality of spaced apart preliminary weakenings, introducing at least one subsequent weakening of the decorative composite through the region of each preliminary weakening.

2. The method according to claim 1, further comprising forming the weakening with at least two subsequent weakenings arranged in a preliminary weakening.

3. The method according to claim 1, further comprising forming each preliminary weakening and the at least one subsequent weakening with different cross-section geometries.

4. The method according to claim 3, further comprising forming the cross-sectional area of each preliminary weakening perpendicular to the depth of the decorative composite with a substantially rectangular cross-section and forming the cross-sectional area of each subsequent weakening perpendicular to the depth of the decorative composite with a substantially round cross-section.

5. The method according to claim 2, further comprising arranging the subsequent weakenings of substantially equidistantly to each other.

6. The method according to claim 1, further comprising introducing the subsequent weakening in at least two successive steps whereby a second subsequent weakening is introduced through a first subsequent weakening and the cross-sectional area of the first subsequent weakening perpendicular to the depth of the decorative composite is larger than the cross-sectional area of the second subsequent weakening perpendicular to the depth of the decorative composite.

7. The method according to claim 6, wherein a laser power used for the introduction of the second subsequent weakening is less than a laser power used for the introduction of the first subsequent weakening.

8. The method according to claim 1, further comprising forming the at least one subsequent weakening so that the at least one subsequent weakening passes through the upholstered layer.

9. The method according to claim 8, further comprising extending the at least one subsequent weakening into the decorative material.

10. The method according to claim 6, further comprising arranging the first subsequent weakening and the second subsequent weakening concentrically to each other.

11. The method according to claim 1, further comprising providing the decorative substrate comprising a substantially rigid plastic or leather.

12. The method according to claim 1, further comprising providing the decorative material comprising at least one of a plastic film, a foam film, leather or a leather-like material.

13. The method according to claim 1, further comprising providing the decorative material comprising sheet goods having a plurality of layers.

14. The method according to claim 1, further comprising providing the upholstered layer comprising at least one spacer fabric, at least one textile nonwoven, or at least one foam.

15. The method according to claim 1, further comprising forming an airbag break line in a decorative composite as at least two weakenings.

16. The method according to claim 1, further comprising introducing the at least one weakening with at least one $CO_2$ laser.

17. The method according to claim 1, further comprising increasing or reducing the temperature of the decorative composite relative to ambient temperature before introducing a weakening.

18. The method according to claim 1, further comprising, during the introduction of the at least one weakening, purging at least the regions arranged adjacent to the weakening with an inert gas.

19. The method according to claim 1, further comprising introducing gas channels into at least parts of the decorative composite in vicinity of the at least one weakening.

* * * * *